United States Patent [19]

Barnett

[11] Patent Number: 5,140,147
[45] Date of Patent: Aug. 18, 1992

[54] INTRAFIELD INTERLEAVED SAMPLED VIDEO PROCESSOR/REFORMATTER

[75] Inventor: James S. Barnett, Dallas, Tex.

[73] Assignee: Texas Instruments Incorporated, Dallas, Tex.

[21] Appl. No.: 567,203

[22] Filed: Aug. 14, 1990

[51] Int. Cl.$^5$ .................................. H01J 40/14
[52] U.S. Cl. ...................... 250/208.1; 250/332; 358/213.22
[58] Field of Search .............. 250/208.1, 330, 332, 250/334; 358/113, 213.22

[56] References Cited

U.S. PATENT DOCUMENTS 3,911,467  10/1975  Levine et al. ............... 358/213.22
4,873,442  10/1989  Klatt ............................ 250/332

*Primary Examiner*—David C. Nelms
*Assistant Examiner*—John R. Lee
*Attorney, Agent, or Firm*—Rene' E. Grossman; Richard Donaldson

[57] ABSTRACT

A method and apparatus for recovering the resolution lost when the FPA FLIR receiver scans the image at a first predetermined frequency to avoid flicker on moving objects. The input image contains 960 lines of coarse resolution data and the output field requires 480 lines of fine resolution data. The processor delays the sampling of the even numbered channels so that these samples occur between the samples taken by the odd numbered channels. The output circuit combines the signals from the odd numbered and even numbered channels which appear on two separate input lines thereto into one interleaved output on an output line. Since the detector elements overlap by 50 percent, the resulting data has increased horizontal resolution at the expense of a slight vertical distortion. More specifically, the processor combines an even numbered line with the odd numbered line thereabove in the first field and with the odd numbered line therebelow in the second field to increase vertical resolution. The vertical distortion generates a fixed frequency component in the output video that can be reduced by a filter.

8 Claims, 15 Drawing Sheets

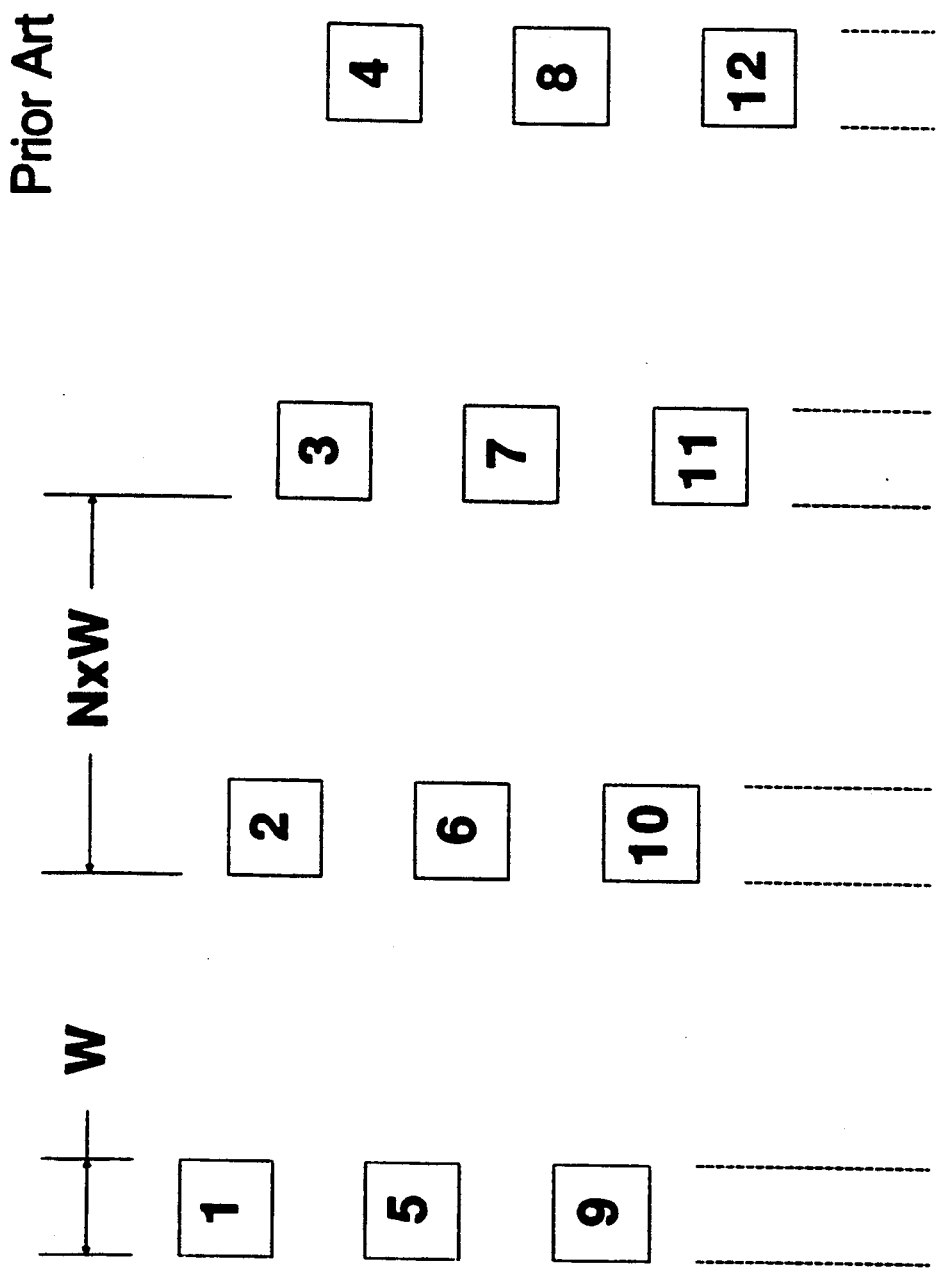
Figure 1 - Focal Plane Array Detector Element Pattern

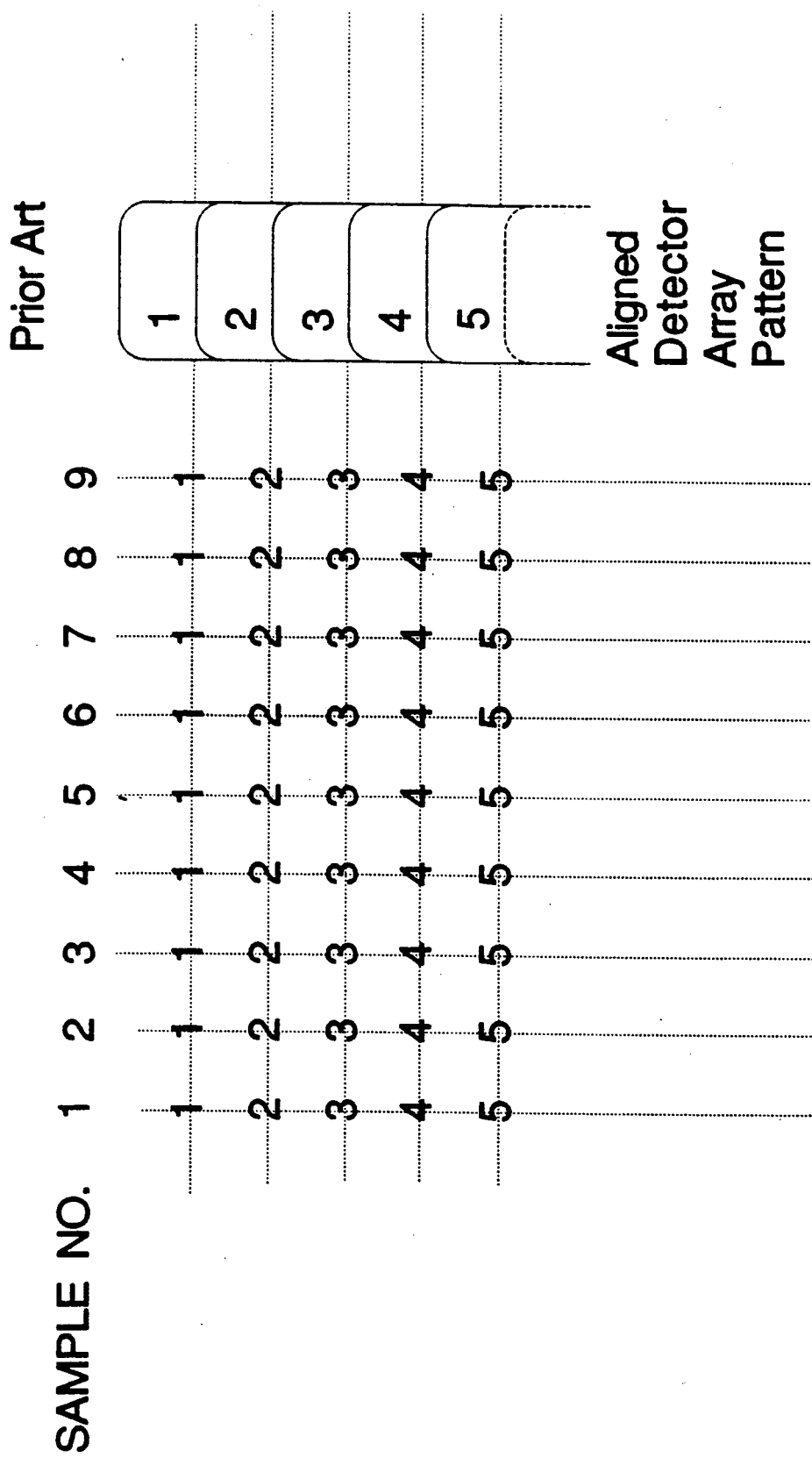
Figure 2 - Prior Art Rectangular Sampling Pattern

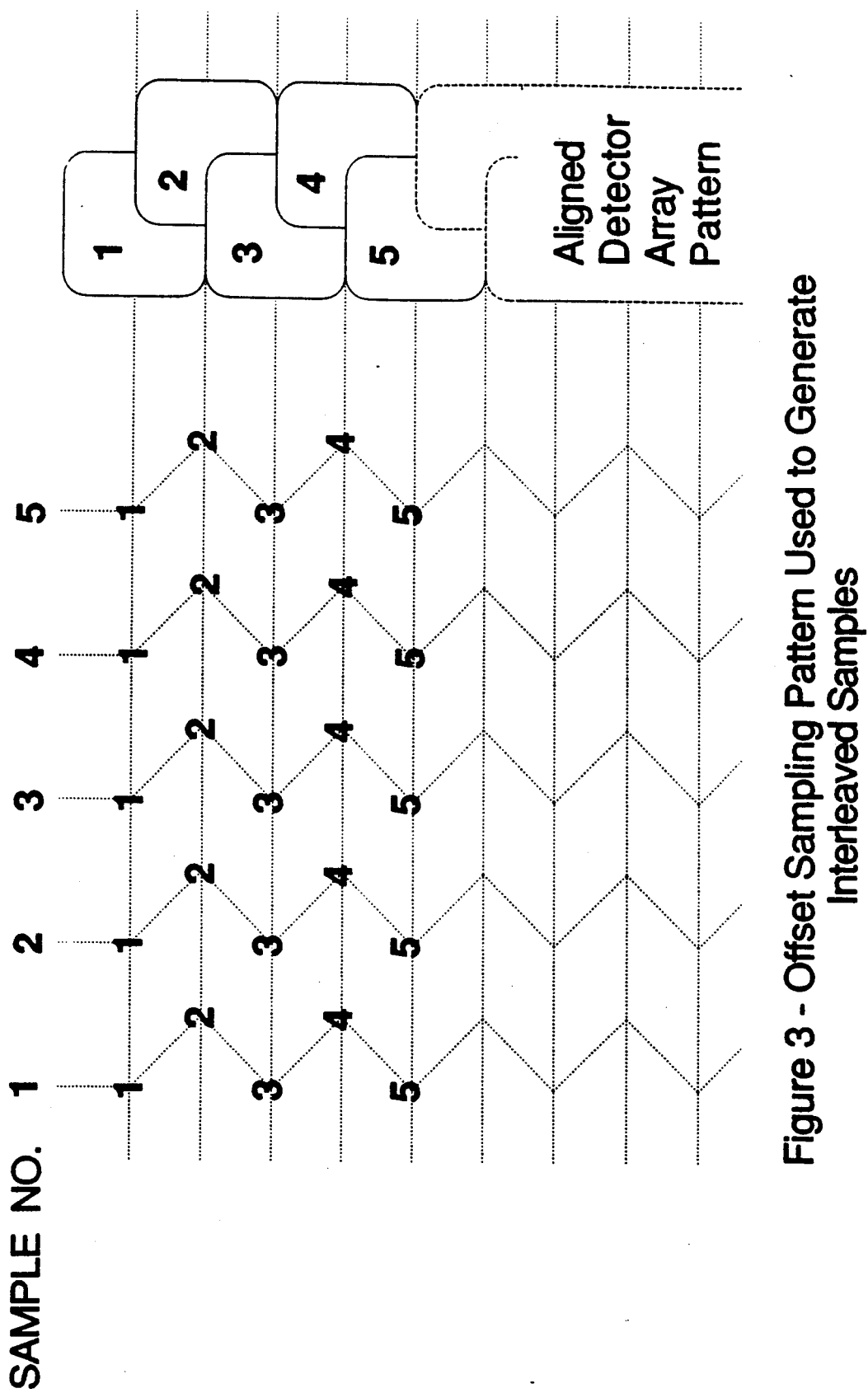
Figure 3 - Offset Sampling Pattern Used to Generate Interleaved Samples

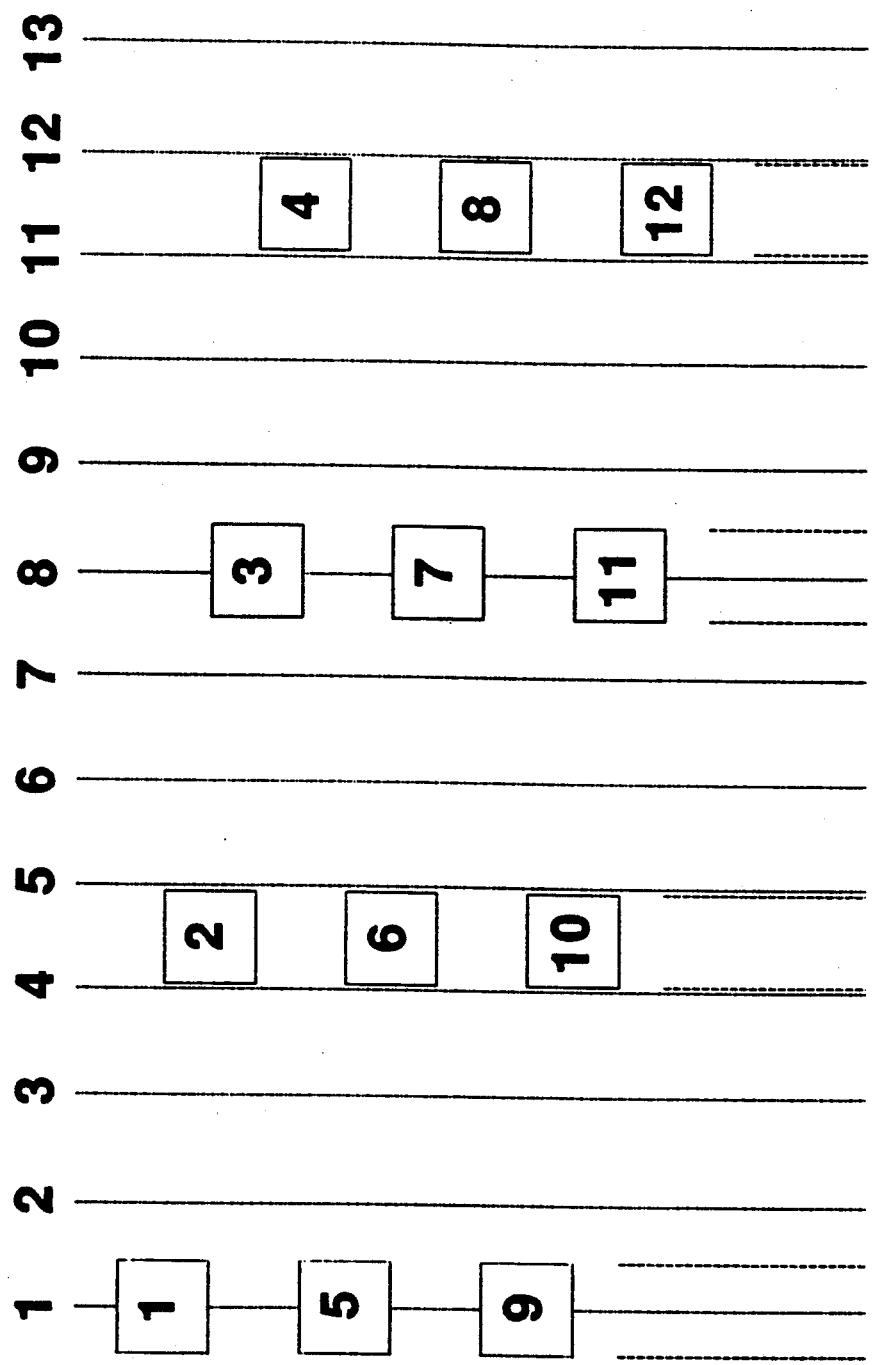
Figure 4 - Revised Sampling Pattern Compared to Detector Array

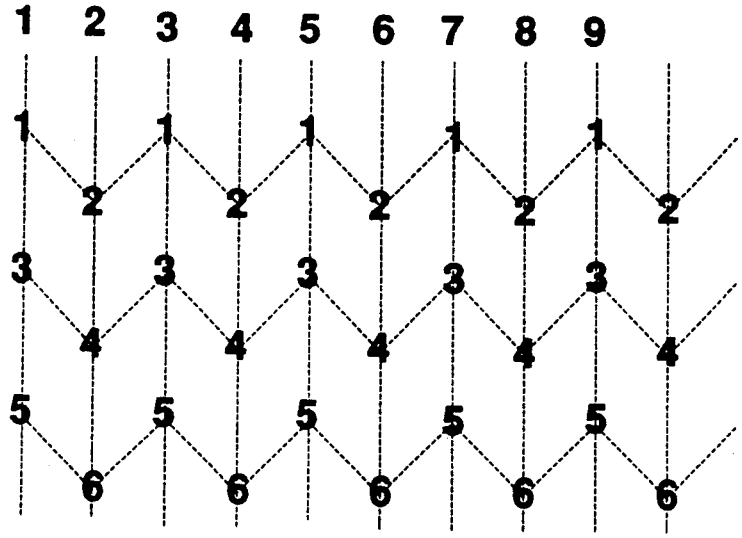
TV Field A Lines on Image Sample Pattern
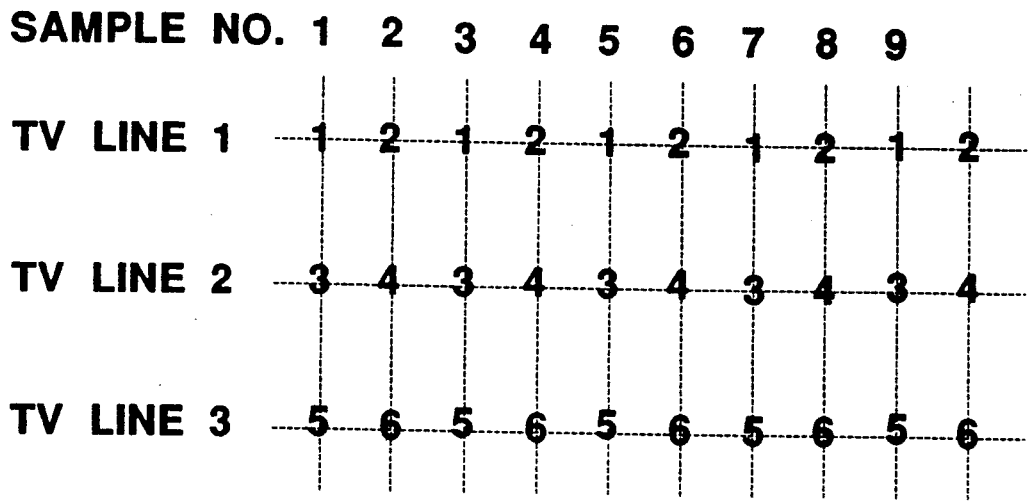
TV Field A as Displayed on Monitor
Figure 5 - TV Field A Line Sample Pattern

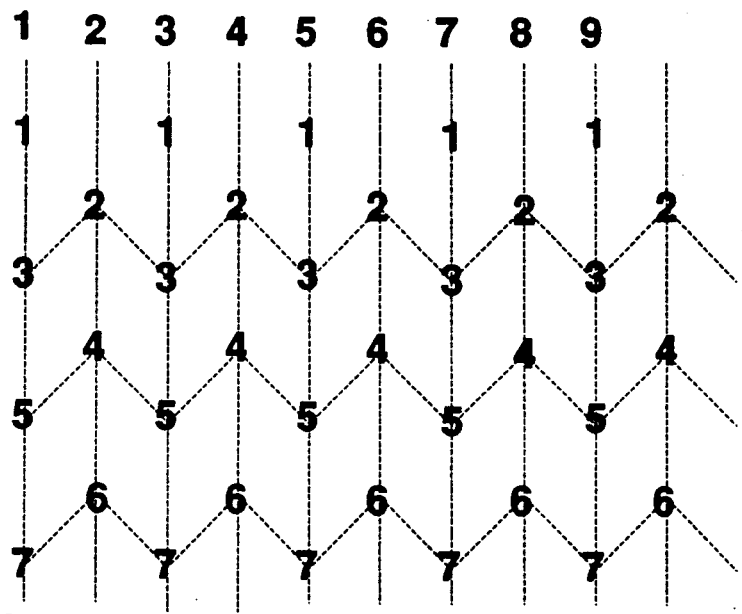
TV Field B Lines on Image Sample Pattern
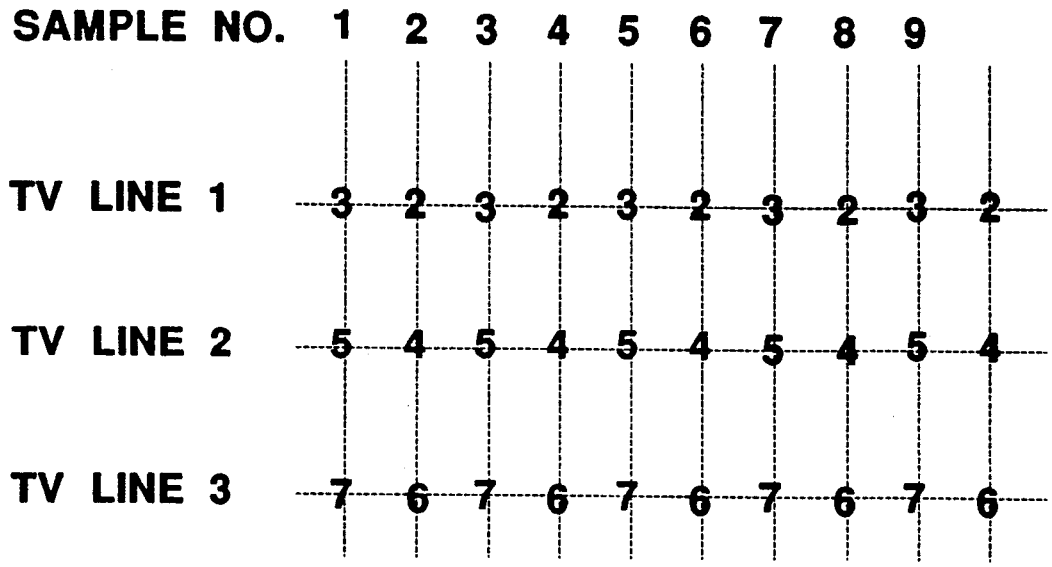
TV Field B as Displayed on Monitor
Figure 6 - TV Field B Line Sample Pattern

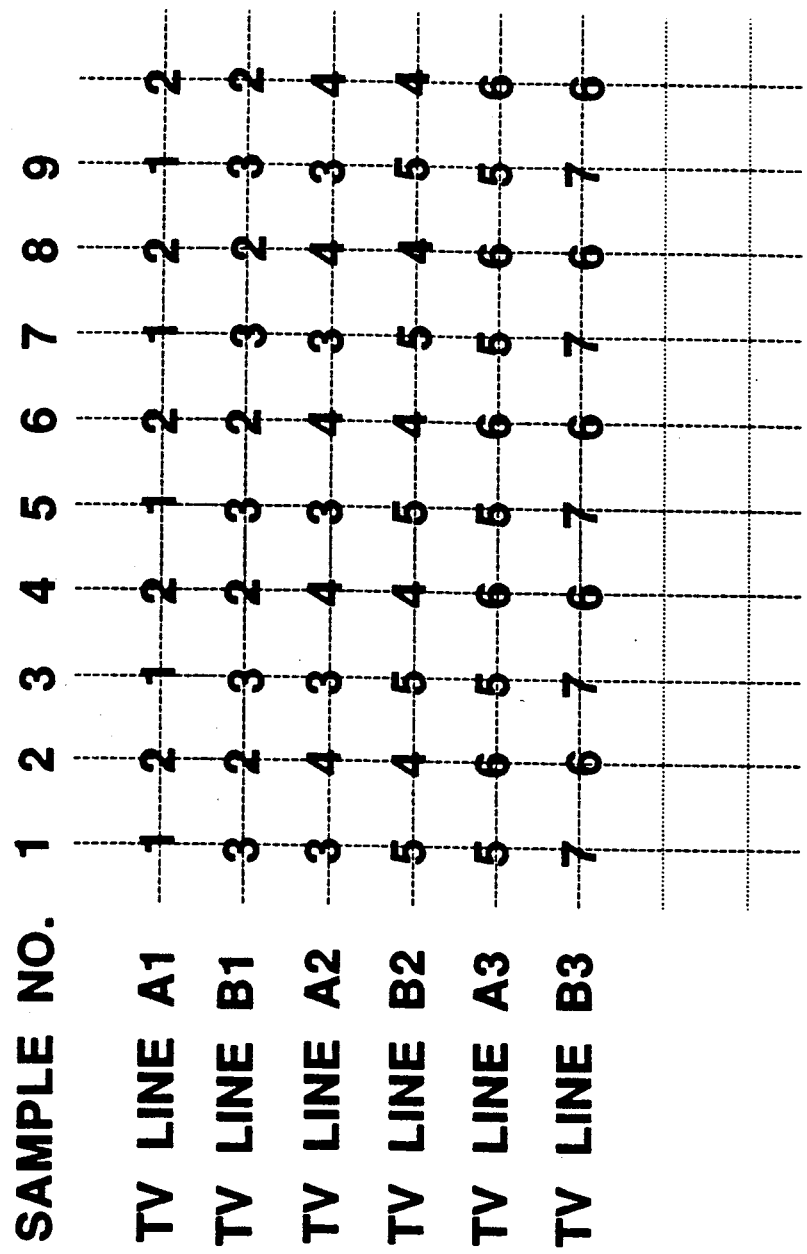
Figure 7 - TV Fields as Displayed on Monitor

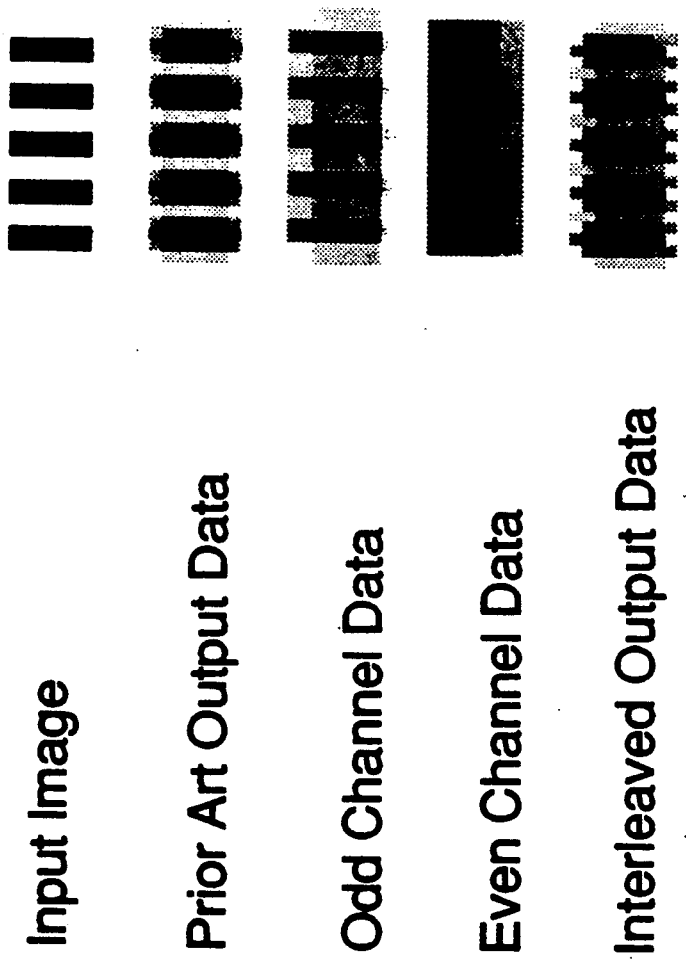
Figure 8 - Comparison of Prior Art Output Image with Interleaved Output Image

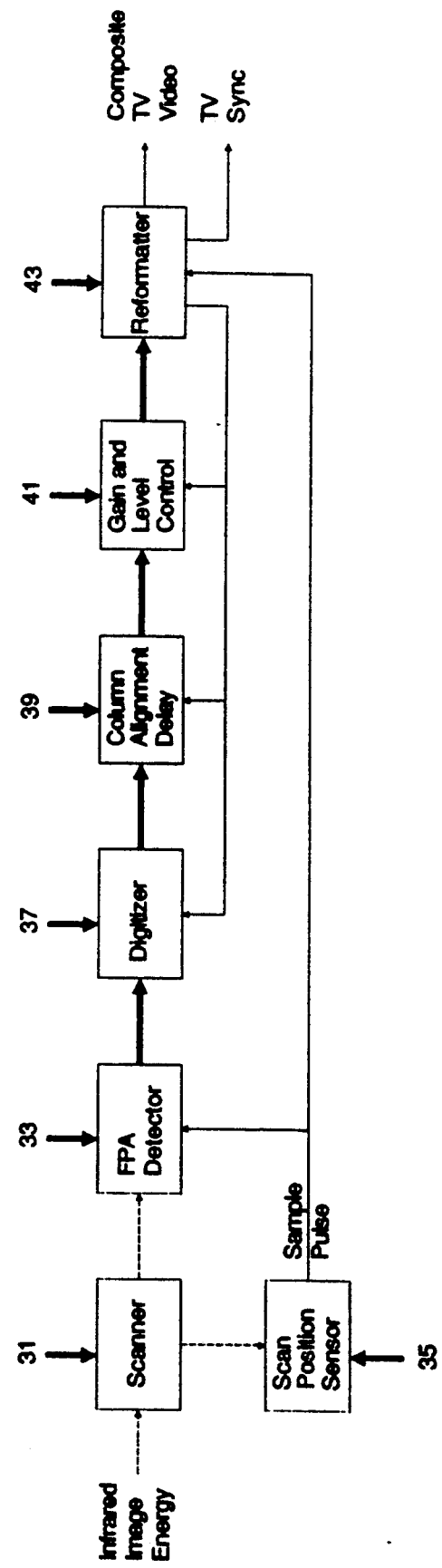
Figure 9 - Video Processor Block Diagram

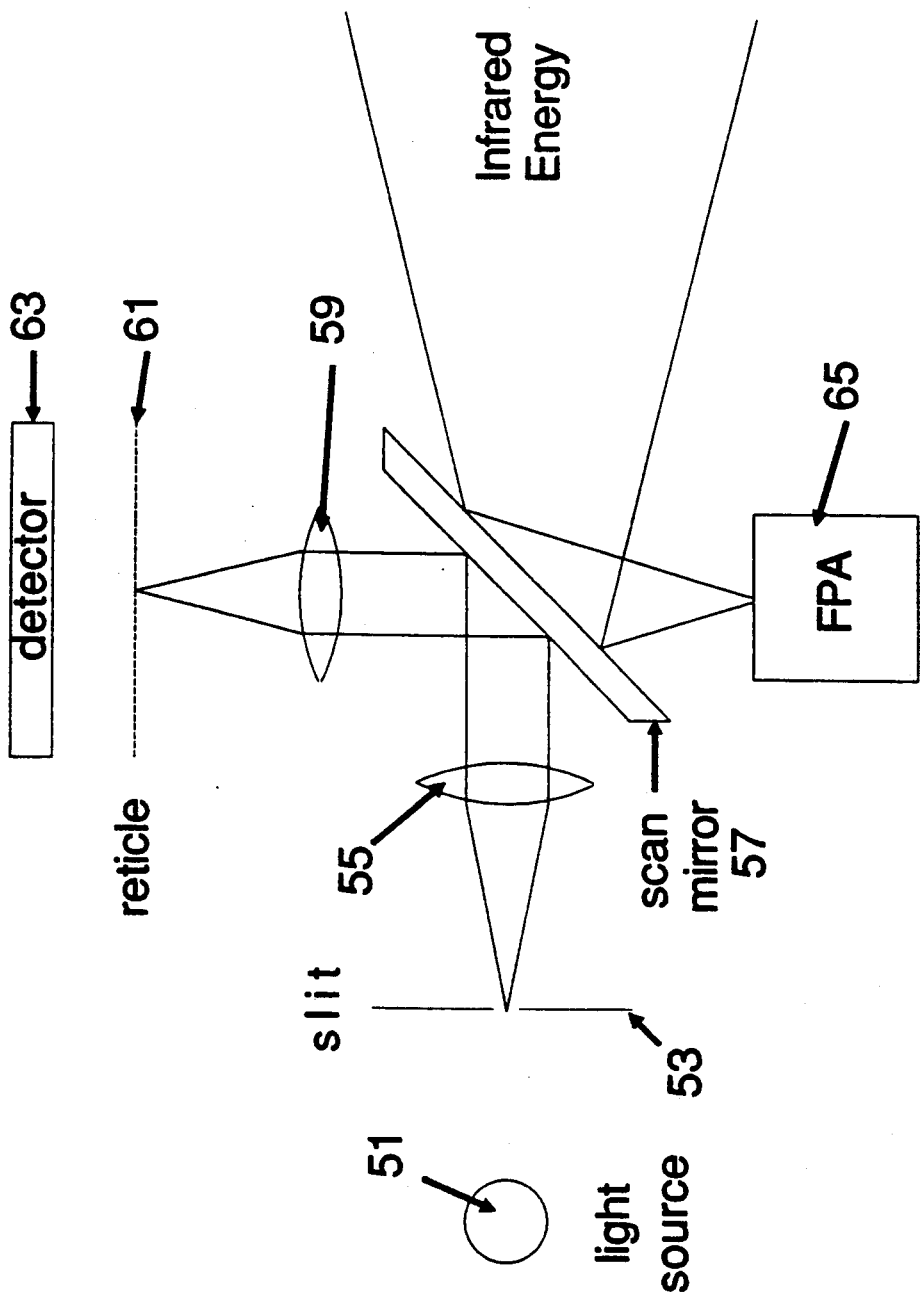
Figure 10 - Scan Position Sensor Diagram

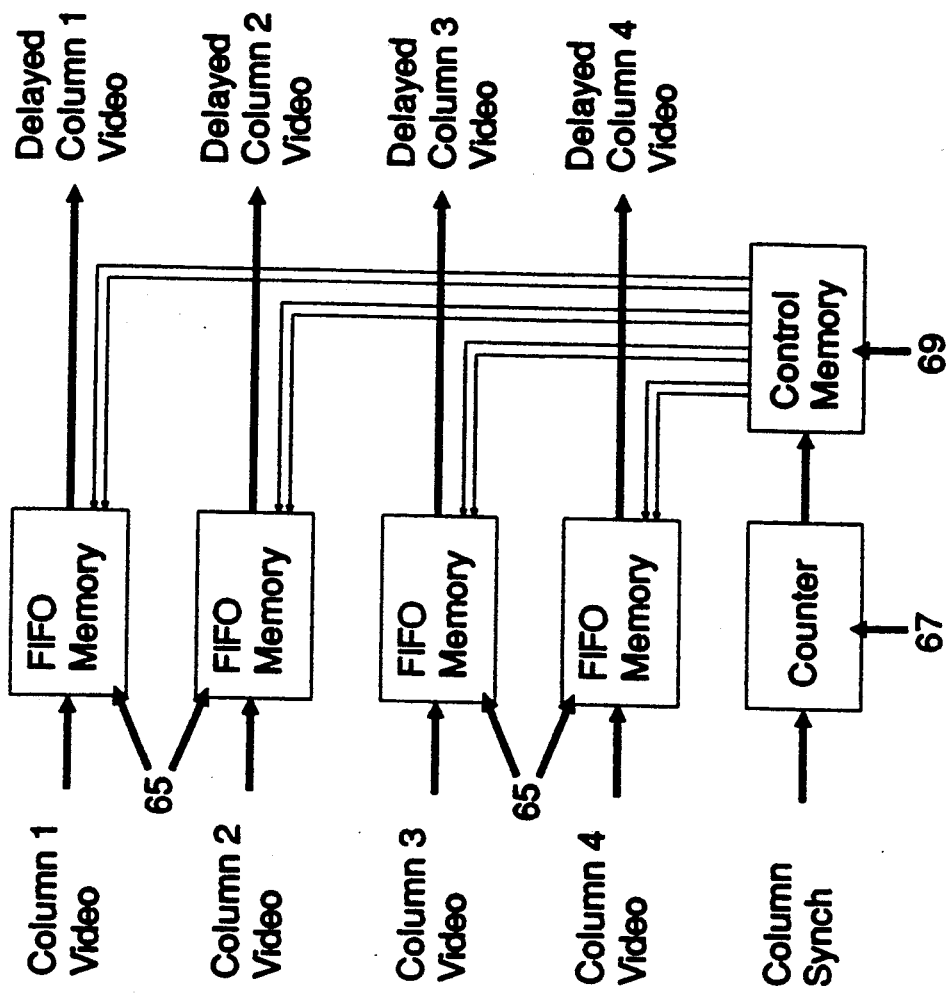
Figure 11 - Column Alignment Delay Circuit Block Diagram

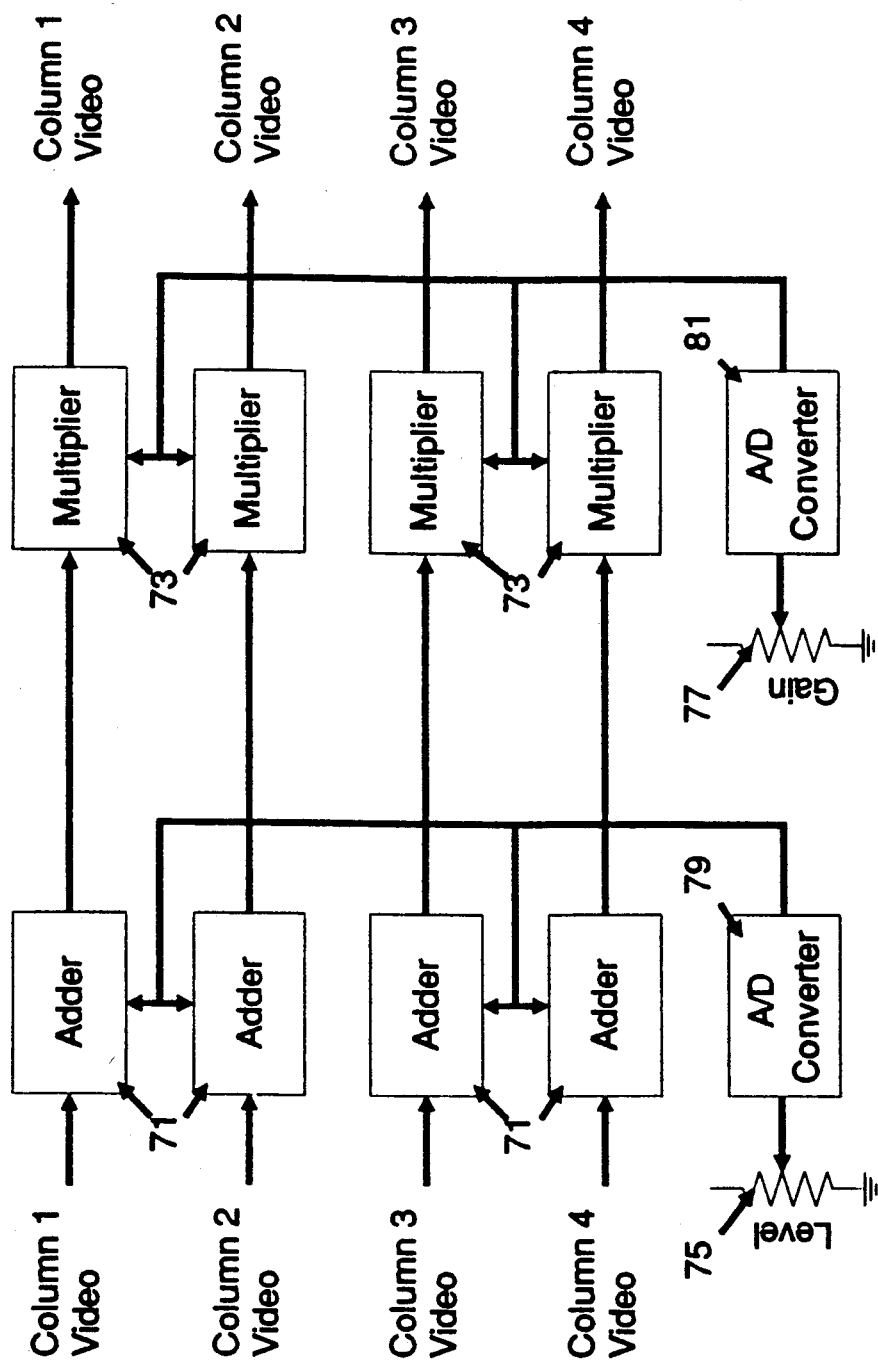
Figure 12 - Gain and Level Control Block Diagram

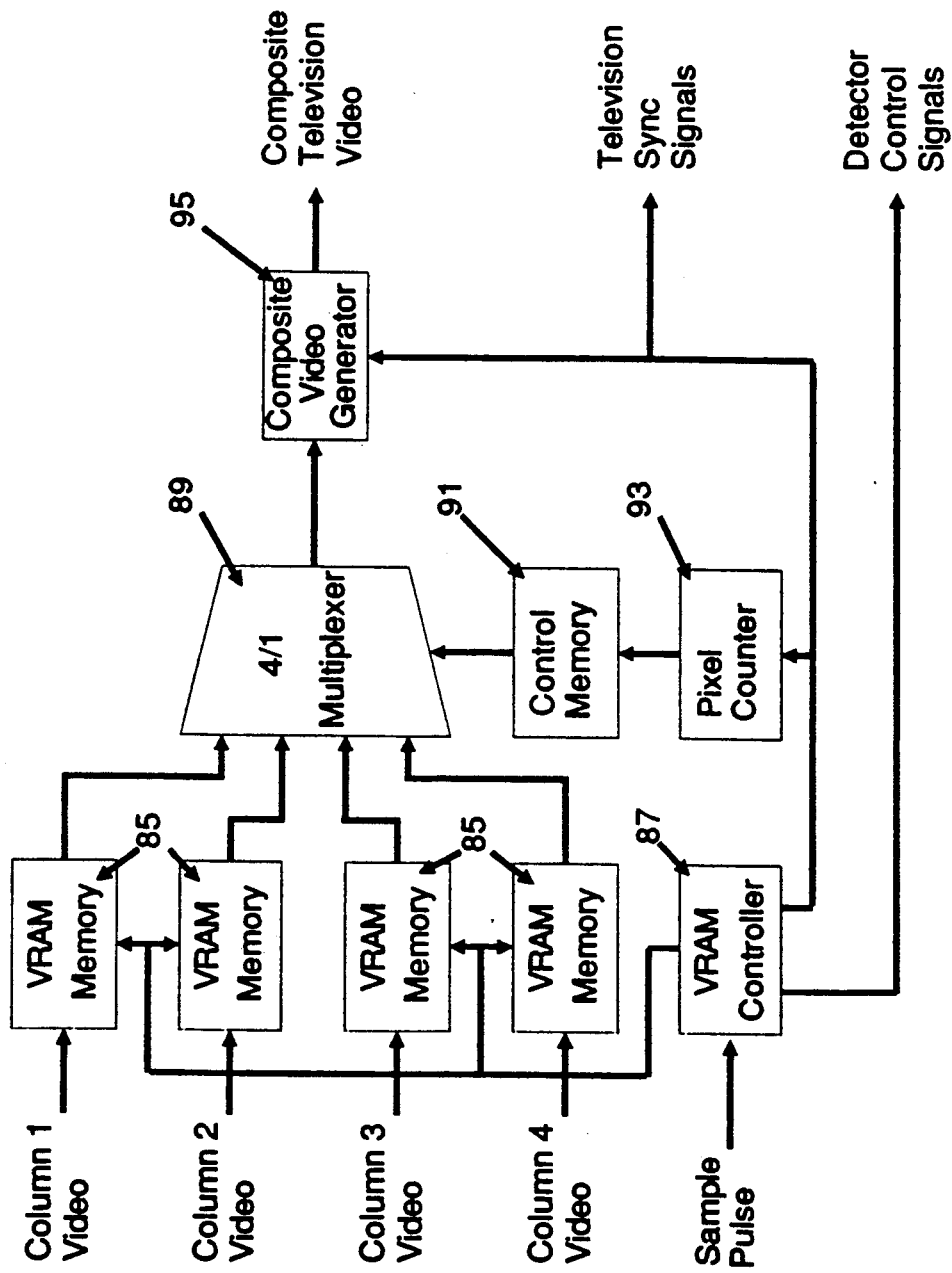
Figure 13 - Reformatter Block Diagram

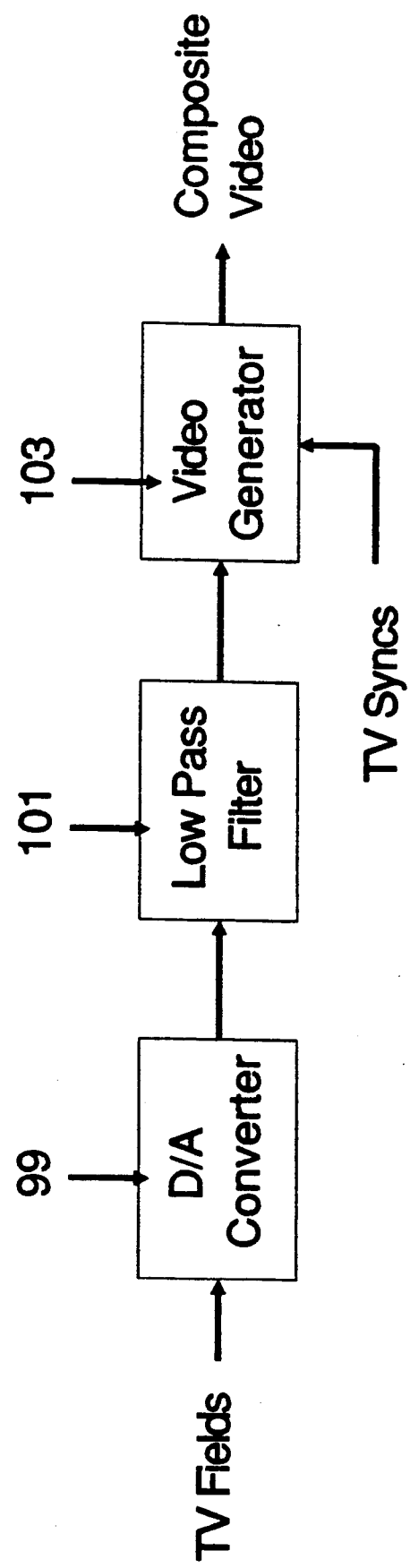
Figure 14 - Composite Video Generator Circuit Block Diagram

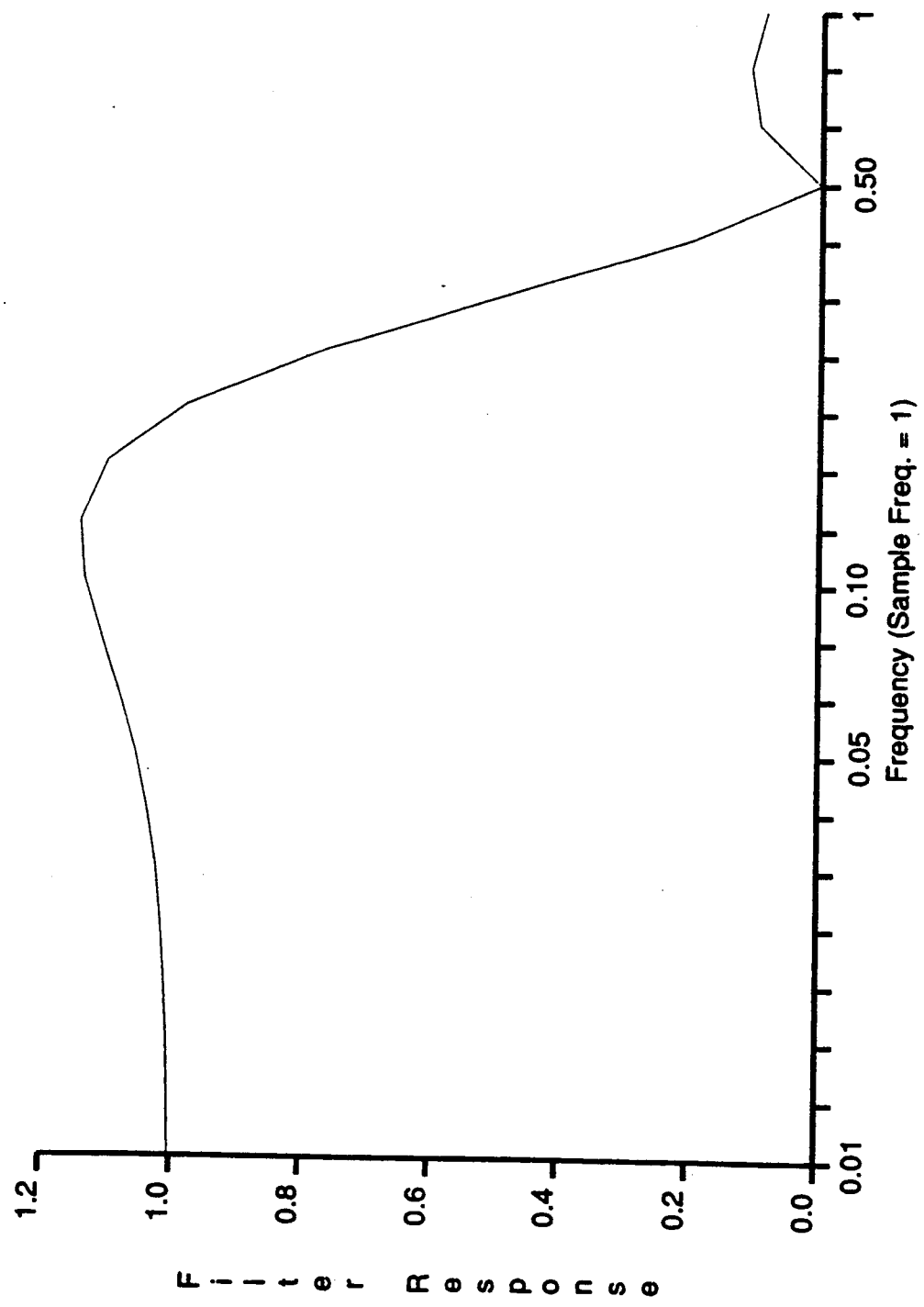
Figure 15 - Low Pass Filter Frequency Response

INTRAFIELD INTERLEAVED SAMPLED VIDEO PROCESSOR/REFORMATTER

BACKGROUND OF THE INVENTION

1. Field of the Invention

This invention relates to forward looking infrared camera systems and, more specifically, to a system and method for increasing the resolution in the scan direction of a camera using a multicolumn focal plane array detector.

2. Brief Description of Prior Art

The present generation of forward looking infrared camera systems that use focal plane array (FPA) detectors has a problem displaying moving objects. Such cameras sample the field of view in one scan per frame with 960 detectors at a 30 Hertz frame rate. The TV monitor that displays the scanned image operates at 30 Hertz frame rate, 60 Hertz field rate, 2 to 1 interlaced. To generate this format, the video processor splits the scanned frame into two fields, each field having half of the information obtained during a single scan, and presents the fields at a 60 Hertz rate on a standard TV monitor. When operating in accordance with this procedure, a moving object being scanned appears to flicker on the TV monitor. This flicker exists because the TV monitor displays the moving target twice during a frame in the same screen location, but one-half frame duration or one field time apart. The next frame presents the target in the same manner with the displacement accumulated due to motion during a full frame time, fooling the observer into seeing momentarily two stationary objects separated in space. Since each object disappears from the TV monitor after a single frame, the moving object appears to jump or flicker. The flicker is not present if the forward looking infrared (FLIR) system both scans and displays the image at the same frequency. Standard 60 Hertz TV monitors have too much flicker over the entire picture when operated at 30 Hertz and the detector cannot sample the image with sufficient speed to operate at a 60 Hertz scan rate without reducing the resolution. Further, the present FPA has two limitations that reduce resolution at 60 Hertz in that the minimum time between samples is 12.8 microseconds and all of the detector elements are sampled at the same time.

SUMMARY OF THE INVENTION

In accordance with the present invention, the resolution lost in the prior art systems is recovered wherein the FPA FLIR receiver scans the image at 60 Hertz to avoid flicker on moving objects. This is accomplished by a method and apparatus for recovering the resolution lost when the FPA FLIR receiver scans the image at a first predetermined frequency to avoid flicker on moving objects. The input image contains 960 lines of coarse resolution data and the output field requires 480 lines of fine resolution data. The processor moves the sampling of the even numbered channels, using the distance between columns, so that these samples occur between the samples taken by the odd numbered channels in the image. The output circuit combines the signals from the odd numbered and even numbered channels which appear on two separate input lines thereto into one interleaved output on an output line. Since the detector samples occur every one-half sample interval, the resulting data has increased resolution in the scan direction at the expense of a slight distortion in the across scan direction. More specifically, the processor combines an even numbered line with the odd numbered line thereabove in the first field and with the odd numbered line therebelow in the second field to increase vertical resolution. The vertical distortion generates a fixed frequency component in the output video that can be reduced by a filter.

BRIEF DESCRIPTION OF THE DRAWINGS

FIG. 1 is a schematic diagram of a focal plane array detector element pattern in accordance with the prior art and as used in accordance with the present invention;

FIG. 2 is a diagram of a prior art normal rectangular sampling pattern;

FIG. 3 is a diagram of an offset sampling pattern used to generate interleaved samples;

FIG. 4 is a diagram of a revised sampling pattern compared to the detector array;

FIG. 5 is a diagram of TV field A lines on an image sample pattern and TV field A lines as displayed on a monitor;

FIG. 6 is a diagram of TV field B lines on an image sample pattern and TV field B lines as displayed on a monitor;

FIG. 7 is a diagram of the interlaced TV fields of FIGS. 5 and 6 as displayed on a monitor;

FIG. 8 is a comparison of simulations of the displays produced by the prior art standard FLIR and the interleaved FLIR in accordance with the present invention;

FIG. 9 is a block diagram of a video processor in accordance with the present invention;

FIG. 10 is a schematic diagram of the scan position sensor of FIG. 9;

FIG. 11 is a block diagram of the column alignment delay circuit of FIG. 9;

FIG. 12 is a block diagram of the gain and level control circuit of FIG. 9;

FIG. 13 is a block diagram of the reformatter circuit of FIG. 9;

FIG. 14 is a block diagram of the composite video generator of FIG. 13; and

FIG. 15 is a graph of the low pass filter frequency response of the filter of FIG. 14.

DESCRIPTION OF THE PREFERRED EMBODIMENT

Referring now to the preferred embodiment, there is shown the method and apparatus for recovering the resolution lost when the FPA FLIR receiver scans the image at, for example, 60 Hertz to avoid flicker on moving objects in accordance with the present invention wherein the input image contains 960 lines of coarse resolution data and the output field requires 480 lines of fine resolution data. The focal plane detector has 960 detector elements, the first twelve of which are shown in FIG. 1, arranged in four parallel columns, 240 elements per column. The distance between the columns (N×W) is an integer multiple of the detector element width (W). The vertical gap between the detectors in each column is one detector element width (W). The vertical position of an element in one column and an element in the next column, along the column, is one-half of an element width (½W) so that if the image moves over the array, perpendicular to the columns, each point in the scanned area in the image will be covered by two detector elements (the detectors overlap).

The standard manner of using the above described detector array is to move the image over the detector at a speed that allows the detector elements to be sampled twice (double sampling) during a single detector dwell time (the detector dwell time is the time it takes for a point in the image to cross the face of the detector element). The overlap and double sampling reduces the spatial aliasing in the image. The processing electronics delays the signals from the leading detector array elements so that these signals line up with the last column, the processing electronics then converting the data to television format. This operation produces the rectangular sampling pattern shown in FIG. 2.

If the image is moved over the detector at twice the speed as depicted in FIG. 2 while sampling at the same rate to obtain, for example, 60 Hertz operation as opposed to 30 Hertz operation in FIG. 2, a rectangular sampling pattern results with twice the horizontal spacing of each sample from each detector element (FIG. 2 with the even numbered samples omitted), thereby reducing resolution and increasing aliasing. However, if the sampling spacing is increased by a factor that allows the even columns to be moved in the scan direction one half detector element width relative to the odd columns as shown for samples for detector elements 2, 4, ... in FIG. 3, the diamond shaped sampling pattern shown in FIG. 3 results. The following equation provides the required factor:

$$F = (2*N)/(2*K - 1)$$

where:
F = Sample rate factor
N = Detector column spacing in detector widths
K = Integer greater than 1.

FIG. 4 shows this sampling spacing overlaid on the detector array pattern for the case where N=K=4 wherein the numbered (1 to 13) vertical lines represent the position of the middle of detector 1 at successive samples. Notice that the midpoints of detectors 1 and 3 are on the lines while the midpoints of detectors 2 and 4 are midway between the lines. FIG. 4 shows that the detector signals have the following relationships:

1. Detector 2 at sample position 1 is one-half interval horizontally from detector 1 at sample position 4.

2. Detector 3 at sample position 1 lines up with detector 1 at sample position 8.

3. Detector 4 at sample position 1 is one-half interval horizontally from detector 1 at sample position 11.

If the signal from detector 2 is stored for three sampling times and combined with the detector 1 signal in a group, the group will cover an area in the image shaped like the top two squares in FIG. 3. This group also includes detector 3 stored for seven sample times, detector 4 stored for ten sample times, etc. detector 5. detector 6 stored for three sample times, etc. The processor interleaves the resulting staggered samples to provide the high resolution output TV fields. The following table shows the source of the data displayed in the top left corner of the display screen. The entries in the table have the following form:

(A,B,C)

where
A = IR Field
B = Detector Channel
C = Sample Number

| TV Field | TV Line | Interleaved TV Format TV Column Number | | | | |
|---|---|---|---|---|---|---|
| | | 1 | 2 | 3 | 4 | |
| A | 1 | (1,1,11) | (1,2,8) | (1,1,12) | (1,2,9) | ... |
| B | 1 | (2,3,4) | (2,2,8) | (2,3,5) | (2,2,9) | ... |
| A | 2 | (1,3,4) | (1,4,1) | (1,3,5) | (1,4,2) | ... |
| B | 2 | (2,5,11) | (2,4,1) | (2,5,12) | (2,4,2) | ... |
| A | 3 | (1,5,11) | (1,6,8) | (1,5,12) | (1,6,9) | ... |
| B | 3 | (2,7,4) | (2,6,8) | (2,7,5) | (2,6,9) | ... |
| . | . | ... | ... | ... | ... | |

The detector channel numbers (B) are the numbers shown in FIGS. 5, 6, and 7.

FIG. 5 shows how the samples are assembled to provide field A and FIG. 6 similarly shows field B. FIG. 7 shows how the fields A and B are displayed on the monitor screen. FIG. 8 shows a simulation of the result of displaying an image consisting of five bars whose width and spacing is one detector element. The top line shows the input image; the second, the result obtained with a standard camera operating at two samples per bar width; the third, the image produced by the odd channels operating at one sample per bar width; the fourth, the image similarly produced by the even channels; and fifth, the result obtained by interleaving the odd and even channel data in accordance with the present invention. The interleaved image, suing one-half the number of samples in the scan direction, has almost the same response as the standard camera.

The video processor circuitry provides five electronic functions as shown in FIG. 9. The scanner 31 receives infrared energy from an image or scene being scanned and moves the infrared image across the detector 33 at 60 Hertz or times per second. The detector array 33, which is designed to operate at 30 Hertz, receives the energy transmitted thereto from the scanner and measures the intensity of the light received at each detector element thereof and provides a multiplexed analog indication thereof for each of the detector elements. The scan position sensor 35 (described in detail with reference to FIG. 10) measures the position of the scan mirror 57 and generates sample pulses when the scan mirror is pointing the detector at the sample positions in the scene. An optical reticle pattern in the scan position sensor 35 generates the required sample positions. The digitizer 37 converts the multiplexed analog output from detector 33 to digital format. The column alignment delay 39 removes the spacing between the columns of detectors to compensate for the stagger between the detectors and places all the data from a vertical line in the image together in one multiplexer frame. The gain and level control 41 allows the operator to adjust the dynamic range of the data from the column alignment delay circuit to the dynamic range of the TV monitor. The reformatter 43 assembles the video data from the control circuit 41 into a standard TV format analog signal for display on a TV monitor in that the data applied thereto is in vertical column format and is changed to horizontal line format as required by the TV monitor. The requirement for staggered sampling causes changes from the prior art in three of these functions, the scan position sensor 35, the column alignment delay 39 and the reformatter 43.

The scan position sensor 35 is an optical device that generates a pulse when the scan mirror rotates from one sample position to the next. FIG. 10 is a diagram of the scan position sensor 35 and the scanner 31. A light source 51 illuminates a slit 53. The light from the slit passes through a lens 55 and reflects off one of the two reflecting surfaces of the scan mirror 57. Another lens 59 receives the energy reflected from the mirror and forms an image of the slit on a reticle 61. When the mirror 57 rotates, the image of the slit moves over the reticle 61. When the image of the slit 53 coincides with a slot in the reticle 61, light passes through the reticle and strikes the detector 63 which generates a current pulse. The spacing of the slots in the reticle 61 positions the samples in the image. In most designs, the two lenses 55 and 59 are combined and the slit and reticle are in the same plane. An adjustment in the reticle pattern creates the desired staggered sample spacing. This arrangement provides an indication of the instantaneous position of the mirror 57 in its scanning path. Also shown is the infrared energy from the scene being scanned which reflects off of the other reflecting surface of the mirror 57 and onto the focal plane array 65.

The column alignment delay is a circuit that assembles the data in groups that contain one column of pixels in the image. FIG. 11 shows a block diagram of this circuit. The circuit includes one first in, first out (FIFO) memory 65 for each detector array column. A FIFO memory stores the data it receives until it receives a read signal, whereupon the FIFO memory starts to output the data in the same order as received. If the read signal is the write signal delayed by a fixed number of columns of data words, the data will be moved by a fixed number of samples in the image. The counter circuit 67 generates the number of the current column in the scan. This number addresses the control memory 69 which has the read and write signals for each FIFO at each column stored therein. This memory is a read only device programmed to generate the required delays.

The gain and level control is a circuit that changes the average value and magnitude of the video signal in response to two operator controls. FIG. 12 shows a block diagram of this circuit. The circuit includes an adder 71 and a multiplier 73 for each column, two controls 75 and 77, and two analog to digital converters 79 and 81. The level signal voltage from the level control 75 is changed to a binary number by the level A/D converter 79. This number is added to the video data by the adders 71. The gain signal voltage from the gain control 77 is changed to a binary number by the gain A/D converter 81. The output of the adders 71 is multiplied by this number by the multipliers 73 to yield the corrected output.

The reformatter is a memory circuit that changes the order of the data words from along a column to along a channel. FIG. 13 shows a block diagram of this circuit. The circuit includes one video random access memory (VRAM) circuit 85 for each column in the array. Each VRAM memory device bit comprises a dynamic memory circuit and a shift register. (The VRAM device, containing the dynamic memory circuits and shift registers, is a commercially available part). The shift register is connected to the memory cells in one row of the dynamic memory and one row of data can be transferred in one operation. The VRAM controller 87 writes the data in an address pattern that aligns the detector channels with the rows in the memory array. During TV field generation, the controller 87 dumps the data into the shift registers where it can be shifted out at high speed. In the depicted configuration, the 4/1 multiplexer 89 selects the memory 85 where the required line was stored. To generate interleaved TV fields, the multiplexer 89 switches memories between each pixel. The pixel counter circuit 93 generates a series of pixel numbers that indicate where the current pixel is in the displayed image. This number addresses the control memory 91 which contains the column number of the required data for this location. This column number switches the multiplexer 89 to transmit the required data to the composite video generator 95 which converts the digital data to an analog voltage and adds the sync signals.

Since the interleaved samples are also staggered in the vertical direction and are all displayed in the same vertical position, a displayed image with a horizontal edge will have serrations along the edge which are one sample wide and one sample deep. This pattern generates a component in the horizontal formatted video at one-half the sample frequency. This component can be removed by a low pass filter with a null at this one-half the sample frequency. FIG. 14 shows a block diagram of the composite video generator 95 of FIG. 13 that suppresses this error. A digital to analog converter 99 changes the television field data from the reformatter circuit to analog format. The low pass filter 101 removes the unwanted component and the video generator 103 adds horizontal and vertical sync signals to make standard composite video. FIG. 15 shows the required filter frequency response of the low pass filter 101 of FIG. 14.

Though the invention has been described with respect to a specific preferred embodiment thereof, many variations and modifications will immediately become apparent to those skilled in the art. It is therefore the intention that the appended claims be interpreted as broadly as possible in view of the prior art to include all such variations and modification.

I claim:

1. A method for recovering the resolution lost when a receiver scans an image at a first predetermined frequency to avoid flicker on moving objects, comprising the steps of:
    (a) providing a detector array having detectors disposed in matrix formation composed of a plurality of rows and a plurality of columns;
    (b) scanning energy over said array to provide an output from each said detector indicative of the energy impinging thereon;
    (c) shifting the outputs from each of said detectors in alternate said rows in the same direction to a location between the original columnar position thereof and the next columnar position in the direction of said shifting;
    (d) forming a first field composed by combining alternately the outputs of alternate ones of said rows and the shifted outputs in an adjacent row in a predetermined direction; and
    (e) providing a display for reading out said first field to provide a display of said outputs.

2. The method of claim 1 further comprising forming a second field composed by combining alternately the output of said alternate ones of said rows and the shifted outputs in an adjacent row in a direction opposite to said predetermined direction and reading out said second field to provide an interlaced display with said first field.

3. The method of claim 1 wherein said energy is infrared energy.

4. The method of claim 2 wherein said energy is infrared energy.

5. A system for recovering the resolution lost when a receiver scans an image at a first predetermined frequency to avoid flicker on moving objects, comprising:
   (a) a detector array having detectors disposed in matrix formation composed of a plurality of rows and a plurality of columns;
   (b) a scanner for scanning energy over said array to provide an output from each said detector indicative of the energy impinging thereon;
   (c) a shifting circuit for shifting the outputs from each of said detectors in alternate said rows in the same direction to a location between the original columnar position thereof and the next columnar position in the direction of said shifting;
   (d) a first field forming circuit for forming a first field composed by combining alternately the outputs of alternate ones of said rows and the shifted outputs in an adjacent row in a predetermined direction;
   (e) reading out said first field to provide a display of said outputs.

6. The system of claim 5 further comprising a second field forming circuit for forming a second field composed by combining alternately the output of said alternate ones of said rows and the shifted output in an adjacent row in a direction opposite to said predetermined direction and reading out said second field to provide an interlaced display with said first field.

7. The system of claim 5 wherein said energy is infrared energy.

8. The system of claim 6 wherein said energy is infrared energy.

* * * * *